United States Patent [19]

Richter

[11] 4,030,617

[45] June 21, 1977

[54] ROBOT DEVICE

[75] Inventor: Hans Richter, Augsburg, Germany

[73] Assignee: Keller & Knappich Augsburg Zweigneiderlassung der Industrie-Werke Karlsruhe Augsburg Aktienegesellschaft, Germany

[22] Filed: July 21, 1975

[21] Appl. No.: 597,825

[30] Foreign Application Priority Data

July 22, 1974 Germany .......................... 2435156

[52] U.S. Cl. ........................................... 214/1 CM
[51] Int. Cl.² ........................................... B66C 1/10
[58] Field of Search .... 214/1 CM, DIG. 2, DIG. 11

[56] References Cited

UNITED STATES PATENTS

| | | | |
|---|---|---|---|
| 2,933,205 | 4/1960 | MacDonald et al. | 214/1 CM |
| 2,942,736 | 6/1960 | Landsiedel et al. | 214/1 CM X |
| 3,128,887 | 4/1964 | Guennec et al. | 214/1 CM |
| 3,739,923 | 6/1973 | Totsuka | 214/1 CM X |
| 3,784,031 | 1/1974 | Nütu et al. | 214/1 CM X |
| 3,845,284 | 10/1974 | Taguchi et al. | 214/1 CM X |
| 3,878,652 | 4/1975 | Mosher | 214/1 CM X |

FOREIGN PATENTS OR APPLICATIONS 2,226,407   12/1973   Germany .......................... 214/1 CM Primary Examiner—Evon C. Blunk
Assistant Examiner—Jeffrey V. Nase
Attorney, Agent, or Firm—McGlew and Tuttle

[57] ABSTRACT

The device includes a multipart hand element, movable about plural axes of rotation, secured on a multipart arm element, also movable about plural axes of rotation, and also includes a programming device which can be programmed by following a program track to be covered, as well as drives respective to each axis of rotation operable to displace the parts about the associated axes. A manually operable multipart framework is mounted on the hand-arm unit to extend parallel to the unit for limited displacement relative thereto. A number of switches equal to the number of axes of rotation, and each respective to a single axis, are operable to activate and deactivate the associated drives. The hand element has a terminal part for mounting either a track guide or a tool adapted to follow mechanically the program track. At least a part of the framework is displaceable relative to the unit during such mechanical following, and the switches control the associated drives responsive to such relative displacement of parts of the framework. Respective displacement pickups are operatively associated with each axis of rotation to feed the track program into the programming device responsive to relative displacement of the parts of the units about the associated axis. The coupling elements between the framework and the parts of the unit preferably comprise rotatable springs yielding to a torsional load in the direction of rotation and each spring carries one-half of a switch for turning relative to the other half of the switch, the other half being secured on the respective part of the unit.

20 Claims, 7 Drawing Figures

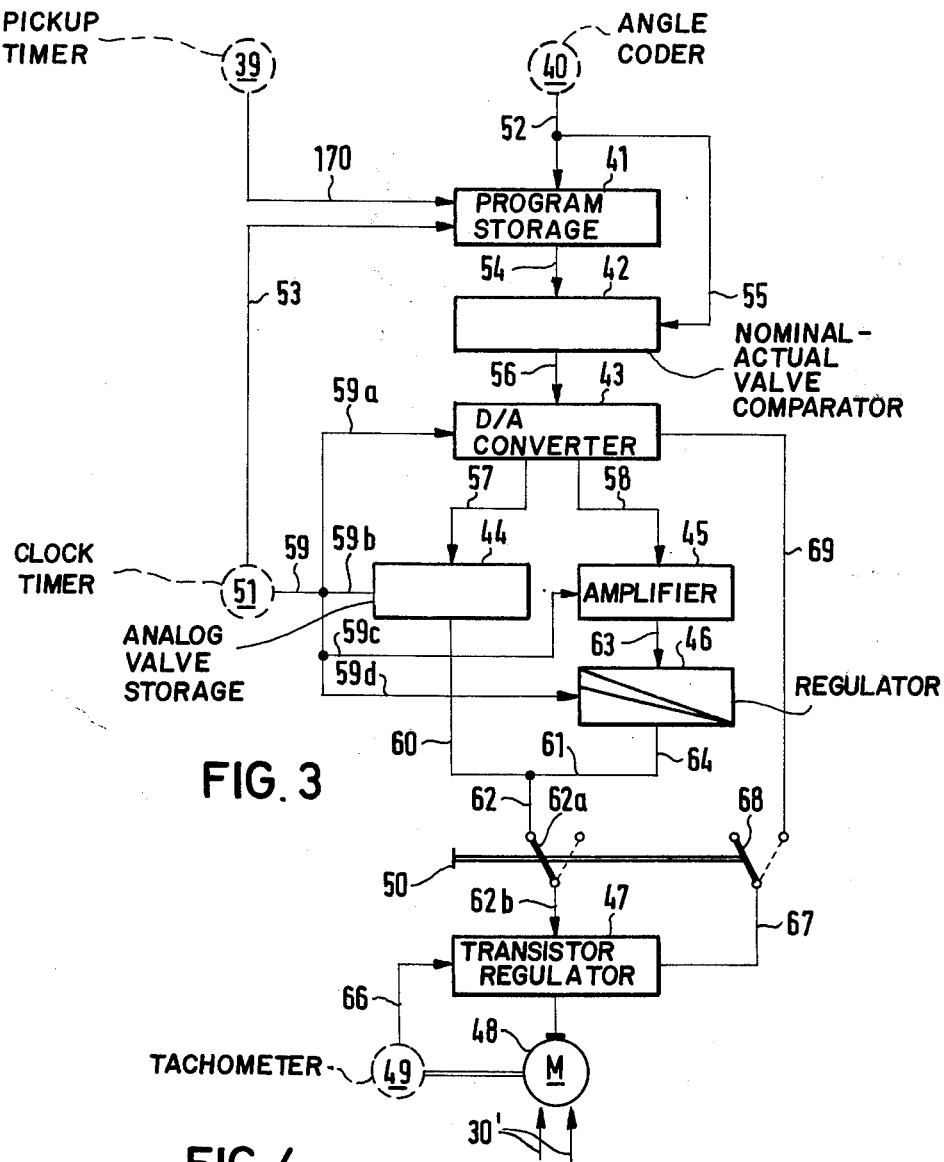
FIG. 3
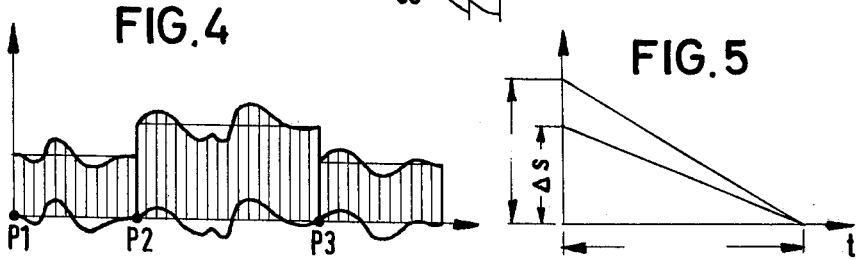
FIG. 4
FIG. 5

ROBOT DEVICE

FIELD AND SUMMARY OF THE INVENTION

This invention is directed to a robot device for the mechanical manipulation of tools or workpieces controlled by a variable program, the device including a multipart hand element, such as a gripper, a holder, etc., movable about plural axes of rotation and secured on a multipart arm element also movable about plural axes of rotation and further including a programming device which can be programmed by following the track, to be covered, with a programmer. More particularly, the invention is directed to a robot device in which the programming is facilitated and improved, resulting in improvement of the quality of the program recording.

In accordance with the invention, this objective is attained by providing a manually movable, multipart framework mounted on the hand-arm unit to extend parallel to the latter with the mounting providing for limited displacement of the framework relative to the unit. A number of switches, corresponding to the number of the axes of rotation and each associated with a respective axis, are assigned to the parts of the unit, and these switches serve to activate and deactivate the respective drives responsive to a movement of the framework, or parts thereof, relative to the parts of the hand-arm unit in order to follow, mechanically, a track guide or tool secured on the terminal hand part, for programming, with the resulting feeding of the track program into the progamming device by displacement pickups such as angle coders, for example.

The manipulation of the framework provided in accordance with the invention requires little effort, and the programmer can follow exactly the track to be covered. Not only do the drives of the robot not need to be made ineffective but, on the contrary, they remain in full readiness and are used effectively, which manifests itself in the programming.

For the switching movements derived from relative movements between the framework parts and the hand-arm parts of the robot device, there is preferably used an embodiment wherein the coupling elements, for coupling of the hand-arm parts to the framework parts, are secured on the hand-arm parts at the respective axes of rotation, and yield, as rotatable springs, responsive to a torsional load, in the direction of rotation. Each torsional spring carries one half of the associated switch, which thus can be turned relative to the other half of the switch secured on the respective part of the hand-arm unit. Strain gauges can be used as the switches. Instead of the rotatable springs in connection with strain gauges, it is also possible to use rotary potentiometers as displacement pickups. On the arm parts, there are arranged switching groups which act as displacement pickups during relative movements between the arm parts and the associated framework parts. At least parts of the scaffold are supported, for example by springs, on the hand parts for limited yieldin relative thereto.

In further accordance with the invention, the coupling elements secured on the hand parts are opposed, in the axes of rotation, by coupling elements which are secured on the framework parts, and the respective opposing coupling parts are connected with each other by a joint coupling which transmits only a pure angle of rotation movement, with free mobility in all other degrees of freedom, such as, for example, a spiral tooth coupling. The manual guidance on the framework parts extending parallel to the hand parts is thus limited exactly to that component of the movements which can be performed by the respective parallel hand part, while the other components of the movement are "filtered out."

In accordance with another feature of the invention, such "filtering out" of undesired components of the relative movements between the hand parts and the framework parts is effected by two electrical displacement pickups arranged between the hand parts and the associated framework parts in a differential connection, and in a plane extending at a right angle to the associated axis of rotation. These electrical pickups have tripping pins bearing on a switching surface extending parallel to the respective axis of rotation, with the pickups being secured on one part of a pair, such as a part of the hand unit, and the switching surface on the other part of the pair, such as a framework part.

The parts of the scaffold preferably are connected with each other by ball bearings whose axes of rotation are coaxial with the axes of rotation of the hand parts. These permit an exact coaxial support, free from play, with a smooth cohesion, the details of these being described hereinafter.

Insofar as the velocity of the track movement and its consideration in programming are concerned, a distinction must be made between three different types, depending on the type of manipulation to be performed by the robot. In spot-welding, for example, only the welding spots are important, while the speed for starting the individual successive spots is of minor importance, and the orders can be given externally, for example, in dependence on the welding after the opening of the welding tongs when the welding operation is completed. For this purpose, it is necessary to store, during recording of the programs within the track to be followed, only the track program data (odometrical data) corresponding to these spots or to some intermediate spots, if necessary, for example, by pressing an electric button arranged on a handle of the framework.

However, particular attention is required for the type of manipulation, such as in electric arc welding, where it is very important that the torch is conducted at a constant speed along the track to be programmed, or as in paint spraying, for example, where the spray gun must be conducted at a variable speed along the track to be programmed. For these types of manipulation, speed measuring data therefore must be added to the odometrical data.

The programmer would be overstressed, however, if it were necessary to move along the track, corresponding to the subsequent welded seam, at a constant speed, for example in programming a track for electric arc welding. For this reason, the invention provides a device for recording the track to be programmed at a neutral speed and, to this end, a wheel rolling along the track to be covered is associated with the track guide secured on a terminal hand part for programming and which, as a displacement pickup timer, permits feeding the track program data into the programming device after rolling along identical path sections. The odometrical data stored at neutral speed can be read back by this displacement pickup timer, as a clock timer, adjustable to equal time intervals. In this way, a manipulation controllable at neutral speed can be performed by the apparatus in its manipulation at constant speed.

In an advantageous further development, the apparatus includes, for the reproduction of the program, a control circuit of a novel type with which a program reproduction, free of interferences, is attained.

An object of the invention is to provide an improved robot device for the mechanical manipulation of tools or workpieces controlled by a variable program.

Another object of the invention is to provide such an improved robot device in which the programming is facilitated and improved.

A further object of the invention is to provide such an improved robot device in which the quality of the program recording is also improved.

For an understanding of the principles of the invention, reference is made to the following description of typical embodiments thereof as illustrated in the accompanying drawings.

BRIEF DESCRIPTION OF THE DRAWINGS

In the Drawings:

FIG. 3 is a block circuit diagram of a part of the programming device associated with a respective axis of rotation;

FIG. 4 graphically illustrates the operation of the control circuit;

FIG. 5 is a graph illustrating the clock signals used in the programming device.

DESCRIPTION OF THE PREFERRED EMBODIMENTS

Figure 1:
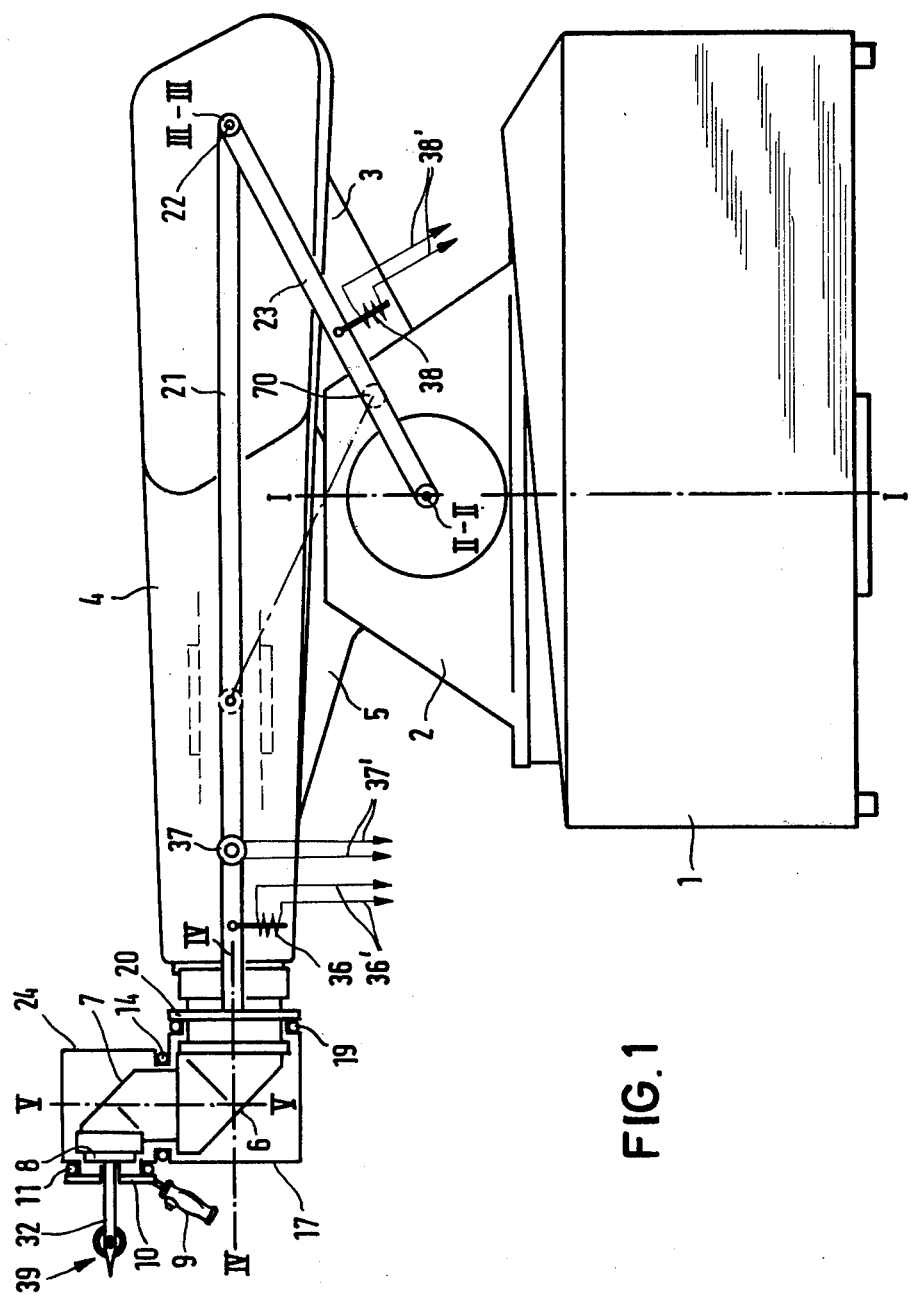
FIG. 1 is a side elevation view of a robot device embodying the invention.
Figure 2:
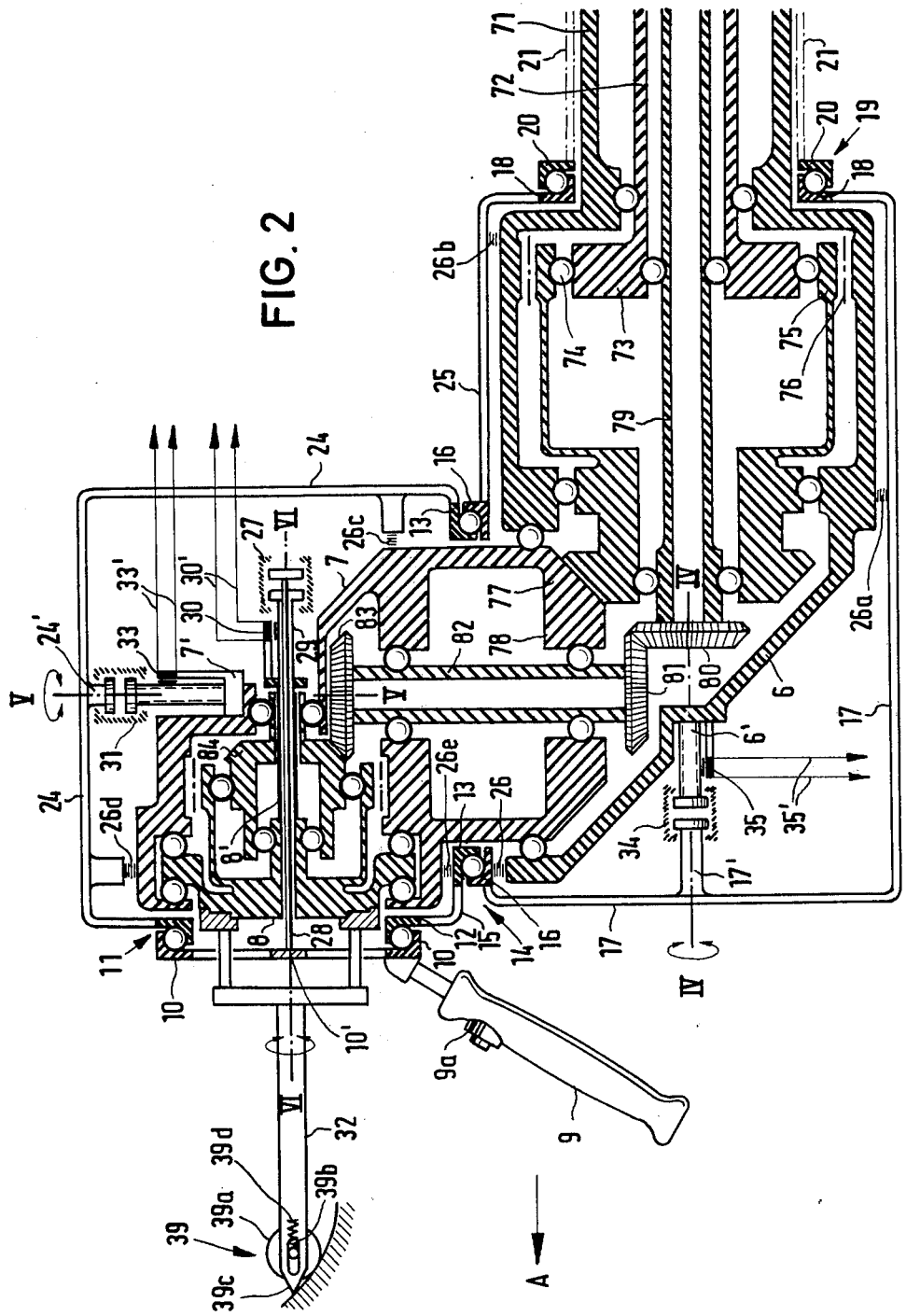
FIG. 2 is an enlarged longitudinal section through the three parts of the hand element.

With the exception of the improvements forming the subject matter of the present invention, the robot device shown in FIGS. 1 and 2 is the same as that illustrated in German Offenlegengschrift No. 2,226,407 and the U.S. application corresponding thereto, Ser. No. 365,641, filed May 25, 1973, and issued as U.S. Pat. No. 3,826,383, on July 30, 1974, and both of which are assigned to the assignee of the present invention. The disclosure of U.S. Pat. No. 3,826,383 is specifically incorporated, by reference, in the present application.

Referring to FIGS. 1 and 2, and as disclosed in FIG. 1 of U.S. Pat. No. 3,826,383, the robot device has a frame 1 carrying a swivel base 2 rotatable about a vertical axis of rotation I—I, and on which there is mounted a pair of upper arms 3 rotating about a horizontal axis of rotation II—II, of which only one arm is shown in FIG. 1. A lower arm 4 is articulated to the pair of upper arms 3 for rotation about a horizontal axis of rotation III—III constituting an elbow joint, as well as, on an axle 70, first ends of a pair of struts 5 whose other ends are connected to lower arm 4 in a sliding guide as disclosed in FIGS. 2 and 4 of U.S. Pat. No. 3,826,383, the rotary drive for swivel base 2, upper arms 3 and struts 5 is effected by high speed electric disc rotor motors, all of which are mounted in swivel base 2, through the medium of belts and gears with a high reduction ratio. These rotary drives are provided for the pair of upper arms 3 at the hubs thereof and, for the lower arm 4, at the hub of the pair of struts 5. The rotary drives maintain the associated parts in the rest position even in their respective adjusted angular positions.

In coaxial relation with the axis of rotation III-13 III of the elbow joint, and as disclosed in FIG. 2 of U.S. Pat. No. 3,826,383 three belt pulleys are mounted in the pair of upper arms 3, and each belt pulley can be driven over belts by a respective electricl disc rotor motor arranged in swivel belt 2. One belt pulley drives a hollow shaft 71 in lower arm 2, as best seen in FIG. 2, through a pair of bevel gears and a gear with a high reduction ratio. At its free end projecting from lower arm 4, hollow shaft 71 carries a wrist part 6 having the form shown in FIG. 2, and writs part 6 is rotatable about an axis of rotation IV—IV.

A second one of the three pulleys arranged coaxially to axis of rotation III—III drives, through a pair of bevel gears, a hollow or tubular shaft 72 also mounted coaxially to the axis of rotation IV—IV. Shaft 72, at its end extending into wrist part 6, carries an elliptic shaft disc 73 having a ball race 74 shrunk thereon and disposed within an elastic shrunk-on externally geared steel bush 75 whose teeth, arranged in the range of its major axis, constantly mesh with the internal gearing 76 of the internally geared wrist part 6 with the same tooth pitch, but with more teeth. With this arrangement, a highly reducing gear is formed whose output is transmitted, through a pair of bevel gears 77, 78, to a first hand part 7 oriented at a right angle to the axis of rotation IV—IV of wirst part 6.

The third pulley coaxial with axis of rotation III—iII drives, through a pair of bevel gear drives, a hollow or tubular shaft 79 mounted coaxially with axis of rotation IV—IV in hollow shaft 72 and in wrist part 6. Shaft 79 carries, at its end, a bevel gear 80 meshing with a bevel gear 81 secured on a shaft 82 mounted in the first hand part 7 coaxially with its axis of rotation V—V. A bevel gear 83 secured at the opposite end of shaft 82 meshes with a bevel gear 84 which is fixedly connected with an elliptic shaft disc on which is shrunk, in the manner described for the parts 73-76, a ball race and an elastic externally geared steel bush shrunk thereon, and whose teeth, in the range of its major axis, mesh constantly with the internal gearing of the internally geared first hand part 7 with the same tooth pitch but with more teeth. First hand part 7 has the form illustrated in FIG. 2. On the elastic externally geared steel bush, there is secured terminal hand part 8, mounted in double ball bearings in the first hand part 7, but rotatable up to 360° about an axis of rotation VI—VI extending at a right angle to the axis of rotation V—V.

The described hand-arm unit comprising the hand element and the arm element is arranged parallel to a multipart framework which can be moved by a handle 9. The first part of this framework, carrying the handle 9, comprises an outer race 10 of a ball bearing 11 rotatable about axis of rotation VI—VI, and having a non-rotatable inner race 12 which, leaving out constructional details in the drawings with respect to the clamping of the two races with each other, is a part of a second framework part, formed by tie rods 15 and 24, rotatable about axis of rotation V—V, the tie rods being stiffened, for example, in the manner of a cage, and the rotatable inner race 13 of a ball bearing 14 rotatable about the axis of rotation V—V of first hand part 7 also forms part of the second framework part. The non-rotatable outer race 16 of ball bearing 14 is rigidly connected, by framework parts 17 and 25, with a rotatable inner race 18 of a ball bearing 19 rotatable about axis of rotation IV—IV of wrist part 6 and forming a third framework part. The non-rotatable outer race 20 of ball bearing 19 is rigidly connected with scaffold part 21 of lower arm 4, and represented in FIG. 2 as displaced by 90° with respect to FIG. 1. Framework part 21 forms an additional framework part which extends along lower arm 4 up to the axis of rotation IV—IV of the elbow joint where it is articulated by a free pivot pin 22, shown in FIG. 1, to one end of an additional framework part 23 which is articulated, at its other end, on swivel base 2 for rotation about axis of rotation II—II. In addition to this mounting point, the framework bears, through a number of elastic elements 26, 26a–e, on the hand parts in the manner indicated in FIG. 2, to permit a relative movement of the framework with respect to the hand-arm unit.

If, for programming the apparatus, a track guide 32 secured on terminal hand part 8, and which can be replaced by a tool, is guided along the track to be covered, for example along a workpiece brought into operative position on frame 1, and is turned, by operating handle 9, only about axis of rotation VI—VI, this rotary motion is transmitted by ball bearing race 10 through its hub 10', to a coupling element in the form of a shaft 28 secured to hub 10' to lie in the axis of rotation VI—VI. A gear wheel, with spiral toothing, arranged at the end of shaft 28, transmits this rotary movement, through the same angle, through a coupling sleeve of a spiral tooth coupling 27 to a correspondingly designed gear wheel which is arranged at the adjacent end of the coupling element 8' secured coaxially on hand part 8. The end section of coupling element 8' is designed as a rotatable spring 29 which yields, in the direction of rotation, under the torsional stress due to rotation by handle 9.

A switch part arranged on spring 29 is thus turned relative to a switch part 30 secured on the hand part 8 through coupling element 8', to supply an electrical output signal over a pair of conductors 30', the signal being proportional to the relative rotation and being transmitted to the driving motor for moving terminal hand part 8 whose speed thus is controlled in correspondence with the magnitude of the signal. The driving motor thus causes the terminal part 8 of the hand element to follow the motion of handle 9, and thus to follow the track guide during manipulation of handle 9, in the desired direction, until manual rotation of handle 9 stops.

In the same manner, a coupling element 24' is provided on framework part 24 in the axis of rotation V—V, and is opposed, through coupling with a spiral tooth coupling 31, by a coupling element 7' in the form of a rotatable spring secured on first hand part 7 and which can be turned, under torsional stress, together with its switch part, relative to a switch part 33 secured on hand part 7 and which supplies an electrical signal output pulse to the drive associated with hand part 7.

Likewise, a coupling element 17' is provided on framework part 17 in the axis of rotation IV—IV, and is opposed, with coupling with a spiral tooth coupling 34, by a coupling element 6' in the form of a rotatable spring secured on wrist part 6, and which can be turned under torsional stress, together with its switch part, relative to a switch part 35 secured on wrist part 6 and which supplies, through conductors 35', an electrical output signal pulse to the drive associated with wrist part 6. Switch part 33 supplies its output signal pulse through conductors 33'.

If, for example, a torque is applied to the framework about the axis of rotation V—V, the rotatable spring of coupling element 7' is twisted because of the resistance of first hand part 7 which is fixed in the state of rest, and the switch part of the rotated spring is rotatable relative to the switch part 33 secured on first hand part 7. As a result, an electrical signal is transmitted over conductors 33' to the driving motor associated with hand part 7. If a torque is applied in a similar manner to handle 9 to rotate the same about axis of rotation IV—IV, a similar action takes place.

The above described application of force on handle 9 can also be used, in the described design of the framework, in any combination, and can be used for the transmission of signals to several driving motors. The spiral tooth couplings 27, 31 and 34 assure that only pure angle of rotation adjustments are effective on the switches 29, 33 and 35, as tooth couplings 27, 31 and 34 are flexible, apart from the tooth pitch, in all other degrees of freedom, so that they act like a mechanical filter.

If handle 9 is pulled in the direction of the arrow shown in FIG. 2, the framework is moved, against the resistance of the hand-arm unit, relative to the latter in the direction of the arrow, an this is made possible by the elastic elements 26, 26a–e. The rotatable springs 29, 6' and 7' are not effected, particularly since the spiral tooth couplings 27 and 34 yield in the axial direction and the spiral tooth coupling 31 does not respond to a movement in the radial direction. Instead, movement in the direction of the arrow is effected and is transmitted, through the assembly of the ball bearings 11 and 19, to framework parts 21 and from there, through free pivot pins 22 in axis of rotation III—III, to framework part 23 so that the latter can be turned slightly about its fulcrum on swivel base 2 in axis of rotation II—II. A relative movement takes place between the switch part secured on framework part 23 and the switch part 38 secured on upper arms 3, so that an electrical switching output pulse is transmitted over conductors 38' to the driving motor associated with upper arm 3.

If, responsive to manipulation of handle 9, framework part 21 performs a relative movement with respect to lower arm 4, a switch part secured on framework part 21 also performs a relative movement with respect to the other switch part 36 secured on lower arm 4, and the driving motor for struts 5, actuating lower arm 4, receives an activating signal over conductors 36'.

Another switch 37 is arranged, perpendicularly to the drawing plane in FIG. 1, between framework part 21 and lower arm 4, and acts during shifting movements about vertical axis of rotation I—I to connect or disconnect a driving motor driving swivel base 2, responsive to signal pulses transmitted over conductors 37', when the shifting force stops. For the return movement, there are provided corresponding elastic elements, of which the representative elements 26, 26a–e form only a part.

Figure 6B:
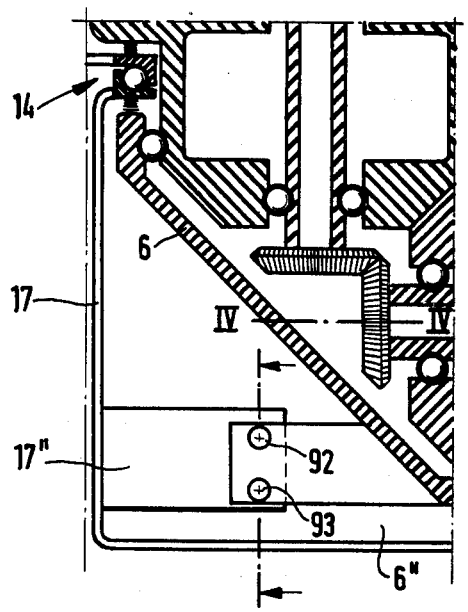
FIGS. 6A and 6B are sectional views, at right angles to each other, illustrating another embodiment of a switching pulse generator.
Figure 6A:
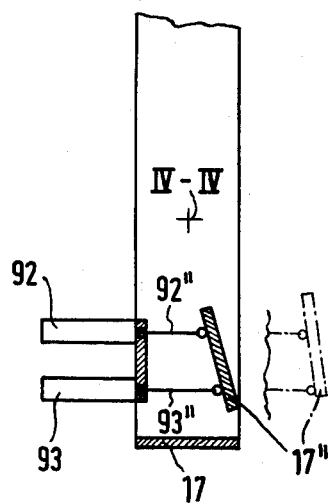

Another embodiment of the invention, for emitting switch pulse for controlling the driving motor, comprises, as shown in FIGS. 6A and 6B, two electrical displacement pickups 92 and 93 secured on a bracket 6" of hand part 6. The pickups can be, for example, in the form of potentiometers or moving coils arranged in a plane extending at a right angle to the axis of rotation IV—IV radially in tandem with respect to this axis. Their tripping pins 92" and 93" bear, under a spring force, on a switching surface 17" which is secured on framework part 17 and which extends parallel to the associated axis of rotation IV—IV. The two displacement pickups 92 and 93 are differentially connected, that is, of the voltages generated by the two displacement pickups, depending on the projection of tripping pins 92", 93", only the difference of these voltages is used by displacement pickups 92 and 93 for generating the switching pulse.

This has the result that, in a relative movement between framework part 17 and hand or wrist part 6, for example, which contains, as a sole component, a movement perpendicular to the drawing plane of FIGS. 2 and 6, the voltages generated by the displacement pickups do change but the difference does not change, since both tripping pins move by the same amount. Furthermore, the difference does not change if the relative movement contains, as the sole component, a movement in the drawing plane. In either case, no output switching pulse is supplied to the drive. The difference changes, however, if the relative movements contain an angle of rotation-variation component with respect to the axis of rotation IV—IV, which is shown in FIG. 6A in end view and in FIG. 6B in side view, where switching surface 17" assumes two different angular positions with respect to hand part 6 and bracket 6", respectively, represented in solid and broken lines. Between these positions, not only does the absolute voltage generated by the displacement pickups 92 and 93 differ, but also the difference between the two differential voltages in the two positions, due to the different projections of tripping pins 92" and 92'" differs, so that a corresponding switching pulse is transmitted to the associated drive. A corresponding arrangement can also be used with respect to the axes of rotation of V—V and VI—VI.

If, in the above described example, there has been assumed a robot device whose parts are fixed in rest position, because of braking positions of their respective motors, and thus form the resistance which is a prerequisite for the production of a relative movement in manipulation, thi can be effected just as well in a sluggish robot device, for example, one which is hydraulically operated.

The following movements of the robot device proper, initiated by manually moving the handle 9 to displace the framework and to cause the track guide 32 to follow the program track, are stored into the programming device of the robot device by a displacement pickup. In the present case, there are used, as the displacement pickup, angle coders which are known and therefore not shown in detail, and this causes the robot to repeat the stored movements automatically, through the medium of a control circuit. Associated with track guide 32 secured on terminal hand part 8 for programming is a wheel 39a rolling along the program track to be covered, and which feeds the track program data into a program device 41, after rolling along equal path sections, through displacement pickup or programming wheel 39.

Wheel 39a can be pushed back behind the free end of track guide 32, having an index point 39c, against the bias of a spring 39d, the wheel 39a moving in a pair of oblong slots 39b. Thereby, even highly curved sections of the track can be programmed, an example of which track is shown in FIG. 2, where the track guide must cover, for example, a long distance, and the wheel itself performs only a small or no rolling movement at all on the track, assuring an easy and safe guidance of the track guide. By means of the displacement pickup, the odometrical data associated with the various motion components are stored in a program storage after a certain track distance has been covered.

When these odometrical data, stored for constant path sections, are read back successively in constant time intervals, the track, which has been previously recorded at a neutral speed, is reproduced at a constant speed. For this purpose, the programming device represented in FIG. 3 has a clock timer 51 which supplies the timing signals necessary for reading back the odometric data in constant time intervals. The frequency of the clock signals of clock timer 51 can be adjustable, so that the absolute magnitude of the constant reproduction speed is adjustable. The manipulation of electric arc welding, for example, to be performed at constant speed, can thus be programmed at a neutral speed.

If, in contrast to the neutral speed recording, the storage of the odometrical data of the track to be programmed is effected not according to constant path sections, by means of the displacement pickup 39, but according to constant timer intervals, by means of clock timer 51, the recording necessary, for example, for the manipulation of paint spraying is effected at the true, variable speed. Since the stored odometrical data are read back with the clock timer 51, the reproduction is effected at the recording speed.

The programming device for the robot device embodying the invention has, for each of the plural axes of motion, and hence in the represented example for the six axes of rotation I—I to VI—VI, a separate division and the divisions are substantially identical is design and function. A division is represented schematically in FIG. 3 for the axis VI—VI, but all six divisions have, in common, only one displacement pickup 39 and one clock timer 51. The individual building blocks of the programming device are well known to one having ordinary skill in the art, both in their design and in their function.

Each of the divisions of the programming device consists of an angle coder 40, assigned to the respective axis of rotation, which transmits signals, in the programming recording of the respective spatial position of this axis, corresponding odometrical data over a line 52 to a program storage 41. In the program storage 41, the corresponding odometrical data are stored as nominal values at the pulse times determined by knob 9a (FIG. 2) during the recording for point-to-point control, at the pulse time of the displacement pickup 39, over line 170, during the recording independently of the recording speed, or at the pulse time of the clock timer 51, through line 53, during recording with the true speed.

In each reproduction of the program, these nominal values are read back successively at the external pulsing time in point-to-point control, or at the pulsing time of clock timer 51, through a line 53, during the reproduction at constant speed or true speed, depending on the type of recording, and are supplied over a line 54 to a nominal-actual value comparator 42 and constantly compared with actual values supplied simultaneously by angle coder 40 over the line 52/55, and which correspond to the actual state of the axis of motion. The difference obtained, as a result of the nominal-actual value comparison, is supplied over a line 56 to a digital-analog converter, known as a D/A converter, 43, where this digital differential value is converted into a corresponding analog value.

In the case of point-to-point control, this analog value is fed to a switch 68, closed by pressing a key 50, and over a line 67, to a transistor regulator 47 which generates the corresponding control signals for the driving motor 48. As mentioned above, each driving motor is an electric high speed disc rotor motor, as described in U.S. Pat. No. 3,826,383, which can be controlled in speed and direction of rotation, depending on the sign of the nominal-actual value comparison.

If other driving arrangements are used, such as hydraulic drives, in place of the above-mentioned electric motors, corresponding servo-valve means are used in place of transistor regulator 47.

In the case of track control, regardless of whether with constant speed or with true speed corresponding to the recording speed, switch 68 is opened by pressing key 50 and, at the same time, a switch 62a is closed as shown in FIG. 3 is solid lines. The control processes in track control, up to the D/A converter 43, take place in the same manner as described above for point-to-point control.

The analog value produced by D/A converter 43 at the pulsing time, that is, at the start of the clock time, is fed, on the one hand, over a line 57 to an analog value storage 44, and is stored there temporarily during the pulsing time. At the same time, the analog value is supplied, during the length of the pulsing time, over the line 60, 62, 62a, 62b as a control signal to transistor regulator 47 which controls motor 48 in correspondence with the control signal. The motor 48, during the pulsing time, remains constant in direction and speed, and thus imparts, to the associated axis of rotation, a corresponding fundamental speed which is proportional to the distance from the next track point.

The analog value produced at the start of the pulsing time by the D/A converter 43 is fed, on the other hand, over a line 58 to an amplifier 45, where this analog value, which is the value $\Delta S$ in FIG. 5, is amplified to the maximum value of the time curve of the clock signal. The amplifier locks on the determined amplification factor, and keeps this factor constant during the rest of the pulsing time, that is, all analog values arriving during the further course of the pulse time from D/A converter 43, and the constantly changing analog values are amplified by the latter with this amplification factor determined at the start of the pulse time. The amplified analog values are fed over a line 63 to a regulator 46 and compared there with the course of the clock signal time curve. If the analog value differs from the respective value of the clock signal time curve, this difference is supplied from regulator 47, as a deviation, over the lines 64, 61, 62a, 62b to transistor regulator 47 and superposed therein on the control signal. That is, transistor regulator 47 constantly adds the control signal and the regulating signal, and controls motor 48 in correspondence to the result of the addition.

In order to assure that the individual building blocks of the control-regulating circuit are exactly identical with the pulse, they are all connected to clock timer 51. Namely, D/A converter 43 is connected thereto over lines 59, 59a, analog value storage 44 over lines 59, 59b, amplifier 45 over lines 59, 59c, and regulator 46 over lines 59, 59d. Clock timer 51 generates a sawtooth clock signal, adjustable in size and duration, and which is represented in FIG. 5, and the analog value arriving from D/A converter 43 is amplified with the amplification factor determined at the start of the clock time from the initial analog value $\Delta S$ and the maximum clock signal value.

The method of operation of the described control-regulating circuit is represented graphically in FIG. 4. On the abscissa are plotted the path distances of the various track points $P_1$, $P_2$, $P_3$ and, on the ordinate, the velocity of the associated track axis. The horizontal lines, parallel to the abscissa, represent the fundamental speed corresponding to the initial analog value of the clock time, and are proportional to the distance of the track points, while the winding line above the abscissa represents the regulating speed corresponding to the deviation. The superposed speed represented is the result of the addition of fundamental speed and regulating speed. This assures that hand terminal part 8 or the tool respectively attached thereon reach, in any case, the intended track point at the expiration of the clock time, independent of any possible action of a disturbance variable.

Finally, FIG. 3 shows a tachometer 49 on motor 48 and which is connected with transistor regulator 47 over a line 66 to serve to monitor the speed.

The control data necessary for manipulation, such as electric are welding or paint spraying, in addition to the measured track data, are supplied in a known manner, which has not been shown, from a control desk.

While specific embodiments of the invention have been shown and described in detail to illustrate the application of the principles of the invention, it will be understood that the invention may be embodied otherwise without departing from such principles.

What is claimed is:

1. In a robot device, for the mechanical manipulation of tools or workpieces controlled by variable programs, including a multipart hand element, movable about plural axes of rotation, secured on a multipart arm element, also movable about plural axes of rotation, a programming device which can be programmed by following a program track to be covered with a programmer, and drives, respective to each axis of rotation of the hand element and the arm element, operable to displace the parts thereof about the associated axes, the improvement comprising, in combination, a manually operable multipart framework mounted on the hand-arm unit, constituted by said hand element and said arm element, to extend parallel to said unit, for limited displacement relative to said unit; a number of switches equal to the number of axes of rotation of said unit, and each respective to a single axis of rotation, operatively associated with the parts of said unit and each operable to activate and deactivate the drive respective to the associated axis of rotation; said hand element having a terminal part for mounting either a track guide or a tool adapted to follow, mechanically, said program track; at least a part of said framework being displaceable relative to said unit during such mechanical following of said program track; said switches controlling the associated drives responsive to such relative displacement of parts of said scaffold to effect corresponding movements of the parts of said hand-arm unit; and respective displacement pickups operatively associated with each axis of rotation of said unit and with said programming device, and each operable to feed the track program into said programming device responsive to relative displacement of the parts of said unit about the associated axis.

2. A robot device, as claimed in claim 1, in which said displacement pickups are angle coders.

3. A robot device, as claimed in claim 1, in which the parts of said framework are mounted on the corresponding parts of said hand element to yield to a limited extent.

4. A robot device, as claimed in claim 1, including switching elements arranged on the parts of said arm element and acting as displacement pickups during relative movements between the parts of said arm element and the associated parts of said framework.

5. A robot device, as claimed in claim 1, including coupling elements secured on the parts of said hand element and coupled with the corresponding parts of said framework; said coupling elements comprising rotatable springs yielding, responsive to torsional loads thereon, in the direction of rotation; each coupling element carrying one half of a switch which can be turned relative to the other half of the switch, which other half is secured on the respective part of said hand element.

6. A robot device, as claimed in claim 5, in which said coupling elements secured on said parts of said hand element are opposed, in the respective axes of rotation, by second coupling elements secured on the parts of said framework; respective joint couplings connecting the opposing ends of said first-mentioned coupling elements with the associated second coupling elements; said joint elements transmitting only a pure angle of rotation movement, and having free mobility in all other degrees of freedom.

7. A robot device, as claimed in claim 6, in which said joint couplings are constituted by spiral tooth couplings.

8. A robot device, as claimed in claim 1, including two electric displacement pickups, arranged in a differential connection, between each part of said hand element and the associated part of said framework, for each axis of rotation, said electric displacement pickups being oriented in a plane extending at a right angle to the associated axis of rotation; each electric displacement pickup including tripping pins bearing on means forming a switching surface extending parallel to the respective axis of rotation; each pair of displacement pickups being secured to one part of a pair of parts and the associated switching surface being secured to the other part of the pair of parts.

9. A robot device, as claimed in claim 8, in which said one part of the pair of parts comprises a part of said hand element and the other part of said pair of parts comprises a part of said framework.

10. A robot device, as claimed in claim 1, including sliding bearings interconnecting the parts of said framework and having respective axes of rotation extending parallel to the axes of rotation of the parts of said hand element.

11. A robot device, as claimed in claim 1, including ball bearings interconnecting the parts of said framework and having respective axes of rotation extending parallel to the axes of rotation of the parts of said hand element.

12. A robot device, as claimed in claim 11, including a manually operable handle secured to a ball bearing outer race forming part of one said ball bearings arranged coaxially with the axis of rotation of said terminal hand part.

13. A robot device, as claimed in claim 12, in which said hand element further includes a first hand part connected to said terminal hand part at an axis of rotation of said hand element, and a wrist part connected to said first hand part at another axis of rotation of said hand element; said ball bearing race coaxial with the axis of rotation of said terminal hand part being operatively associated with an inner ball bearing race rigidly connected by framework parts with a rotatable inner race of a ball bearing coaxial with the axis of rotation of said first hand part; said last-mentioned ball bearing including a non-rotatable outer race rigidly connected by framework parts with a rotatable inner race of a ball bearing coaxial with the axis of rotation of said wrist part; the non-rotatable outer race of the ball bearing coaxial with the axis of rotation of said wrist part being rigidly connected with a framework part connected to said arm element.

14. A robot device, as claimed in claim 1, including a wheel operatively mounted in a track guide secured on said terminal hand part for programming and rolling along the program track to be covered; said wheel acting, after rolling along equal path sections, as a displacement pickup supplying the track program data into said programming device.

15. A robot device, as claimed in claim 14, in which said wheel is displaceable in a longitudinal guide at the free end of said track guide; and a spring biasing said wheel outwardly along said longitudinal guide.

16. A robot device, as claimed in claim 14, including a clock timer, adjustable to equal time intervals; the odometrical data stored by said displacement pickup timer being readable back by said clock.

17. A robot device, as claimed in claim 1, in which said programming device includes, for each axis of rotation, a respective transmitter element producing odometrical data for the production of nominal-actual values corresponding to the track position, a program storage receiving and reproducing nominal track position values, a nominal-actual value comparator, a digital-analog converter converting the digital comparison results supplied by the nominal-actual value comparator into corresponding analog values proportional to the distance to the next track point, and which control the speed of the drive of the associated axis of rotation, and a timing generator controlling the program storage; said programming device including a control-regulating circuit controlling the speed of the associated axis of rotation, during reproduction of a track program, in a manner such that a regulating speed is superposed on the fundamental speed which is constant over the course of the pulse time; said regulating speed being derived from an analog value determined at the start of the pulse time and being kept constant over the course of the pulse time, and controlling the influence of disturbance variables.

18. A robot device, as claimed in claim 17, in which said control-regulating circuit includes an analog value storage, an amplifier, a regulator, and a transistor regulator; said analog value storage storing the analog value supplied, at the start of the pulse time, by said digital-analog converter, temporarily over the course of the pulse time; said analog value storage transmitting the initial analog value, during the course of the pulse time, to said transistor regulator; said amplifier amplifying the analog value, supplied at the start of the pulse time by the digital-analog converter, to the maximum value of the clock signal-time curve, and amplifying all other analog values supplied, during the course of the pulse time by said digital-analog converter, with the amplification factor determined at the start of the pulse time; said amplifier transmitting these amplified analog values to said regulator and said regulator comparing these values with the respective values of the clock signal-time curve and transmitting the results of the comparison to said transistor regulator; said transistor regulator superposing and processing both values for controlling the drive.

19. A robot device, as claimed in claim 18, in which said timing generator generates sawtooth pulse signals adjustable in amplitude and frequency.

20. A robot device, as claimed in claim 18, in which said programming device includes a switch for switching from rack control to point-to-point control; said switch being included in a by-pass circuit and, when closed, providing for the analog values, produced by said digital-analog converter, to be transmitted directly to said transistor regulator in by-passing relation with said analog value storage, said amplifier and said regulator.

* * * * *